(12) United States Patent  
Fai et al.

(10) Patent No.: US 8,880,779 B2  
(45) Date of Patent: Nov. 4, 2014

(54) DEBUGGING A MEMORY SUBSYSTEM

(75) Inventors: Anthony Fai, Palo Alto, CA (US); Nir Jacob Wakrat, Los Altos, CA (US); Nicholas Seroff, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 13/204,037

(22) Filed: Aug. 5, 2011

(65) Prior Publication Data

US 2013/0036254 A1 Feb. 7, 2013

(51) Int. Cl.  
*G06F 12/02* (2006.01)  
*G06F 11/263* (2006.01)

(52) U.S. Cl.  
CPC .................... *G06F 11/263* (2013.01)  
USPC .................. 711/103; 711/E12.008

(58) Field of Classification Search  
CPC .............. G06F 12/0246; G06F 3/0679; G06F 2212/2022; G06F 2212/7211; G11C 16/102  
USPC .......................................... 711/103, E12.008  
See application file for complete search history.

(56) References Cited

U.S. PATENT DOCUMENTS

| | | | |
|---|---|---|---|
| 7,080,789 B2 | 7/2006 | Leaming | |
| 7,386,774 B1* | 6/2008 | Chatterjee et al. | 714/726 |
| 7,761,744 B2 | 7/2010 | Chang et al. | |
| 7,870,430 B2 | 1/2011 | Robertson et al. | |
| 2002/0065646 A1* | 5/2002 | Waldie et al. | 703/26 |
| 2002/0087918 A1 | 7/2002 | Miura et al. | |
| 2005/0039039 A1 | 2/2005 | Moyer et al. | |
| 2011/0010491 A1* | 1/2011 | Anderson | 711/103 |

* cited by examiner

*Primary Examiner* — Yong Choe  
(74) *Attorney, Agent, or Firm* — Meyertons, Hood, Kivlin, Kowert & Goetzel, P.C.

(57) ABSTRACT

In one implementation, a memory subsystem includes non-volatile memory, a memory controller that is communicatively connected to the non-volatile memory over a first bus, a host interface through which the memory controller communicates with a host controller over a second bus, and a joint test action group (JTAG) interface that provides the host controller with access to state information associated with the memory controller. The memory subsystem can be configured to be coupled to a board-level memory device that includes the host controller.

31 Claims, 5 Drawing Sheets

DEBUGGING A MEMORY SUBSYSTEM

BACKGROUND

This document relates to memory subsystems that include one or more joint test action group (JTAG) interfaces.

Various types of non-volatile memory (NVM), such as flash memory (e.g., NAND flash memory, NOR flash memory), can be used for mass storage. For example, consumer electronics (e.g., portable media players) use flash memory to store data, including music, videos, images, and other media or types of information.

JTAG interfaces can include various pins (e.g., test data input pin (TDI), test data output pin (TDO), test mode select pin (TMS), test clock pin (TCK)) that can permit debugging and connectivity testing of a computing device at a board level. For example, a printed circuit board can include a JTAG interface that permits an external and separate computing system to perform debugging and connectivity testing of the board. For instance, connections on the printed circuit board between subsystems (e.g., connection between a central processing unit and a memory subsystem) of the memory device can be tested.

SUMMARY

This document generally describes technologies relating to memory subsystems (e.g., non-volatile memory packages) that include JTAG interfaces. Memory subsystems are distinct and self-contained physical entities that include non-volatile memory (e.g., NAND flash memory), perform memory operations on the non-volatile memory (e.g., read and write operations), and can be installed on (coupled to) a board-level computing device. A board-level device can be termed a "host device" and can include one or more host controllers (e.g., processor(s), microprocessor(s)) that are configured to manage operation of the host device, which can include interacting with one or more memory subsystems installed on the host device (e.g., storing and/or retrieving data from a memory subsystem). For example, a board-level device can be a media player that plays various media files (e.g., music files, video files) as directed by a user. A host controller of such a media player can manage playback of media files, which can involve obtaining requested media files from one or more installed memory subsystems of the media player.

A memory subsystem can include a substrate that is separate from and coupled to a board-level device. For example, a memory subsystem can be a ball grid array package or other suitable type of integrated circuit (IC) package that includes one or more memory dies (e.g., flash memory dies), and can be installed onto a board-level device by coupling pins of the memory subsystem to one or more communication channels embedded in the board-level device.

One or more JTAG interfaces can be included in a memory subsystem. A JTAG interface includes various pins that allow a device/processor external to a memory subsystem, such as a host controller, to access the memory subsystem's internal components (e.g., memory controller, memory dies) and/or internal connections (e.g., internal bus communicatively coupling a memory controller to one or more memory dies). Such access can allow an external device to perform a variety of tests on a memory subsystem, such as connectivity testing (e.g., boundary scan) and/or functional debugging (e.g., trace operation, halt at various breakpoints) of the memory subsystem.

For example, connections between a memory controller and a plurality of non-volatile memory dies of a memory subsystem can be tested through a JTAG interface of the memory subsystem. In another example, commands provided over a JTAG interface can cause a memory controller of a memory subsystem to enter one or more debug modes of operation, such as monitoring for preset breakpoints and/or break conditions, tracing particular operations, single-stepping through various instruction, and/or providing information regarding the state of the memory subsystem (e.g., register values, memory contents, executed instructions, data transmissions over communication channels).

As described in greater detail below, various components can be included in memory subsystems to allow for an external device to test the memory subsystems through a JTAG interface, such as a boundary scan and/or debug modules. A boundary scan is a technique for testing connections between components of a memory subsystem (e.g., memory controller, memory dies) that provide test data to the components and send the test data over communication channels (e.g., internal bus) between the components. Debug modules include one or more circuits that can control operation of a memory controller of a memory subsystem based on various commands received through a JTAG interface.

In one implementation, a memory subsystem includes non-volatile memory, a memory controller that is communicatively connected to the non-volatile memory over a first bus, a host interface through which the memory controller communicates with a host controller over a second bus, and a joint test action group (JTAG) interface that provides the host controller with access to state information associated with the memory controller. The memory subsystem can be configured to be coupled to a board-level memory device that includes the host controller.

In another implementation, a system includes a host controller of a board-level memory device, and one or more memory subsystems of the board-level memory device that are accessible by the host controller over a bus. Each of the memory subsystems can include non-volatile memory, a memory controller that is communicatively connected to the non-volatile memory, a host interface through which the memory controller communicates with a host controller over the bus, and a JTAG interface that provides the host controller with access to state information associated with the memory subsystem.

In another implementation, a method includes receiving, at a memory controller of a memory subsystem through a JTAG interface of the memory subsystem, a command from a host controller to obtain status information for the memory subsystem. The method can further include accessing the state information during operation of the memory subsystem, and providing the status information to the host controller, wherein the memory subsystem is coupled to a board-level memory device that includes the host controller.

Particular embodiments of the subject matter described in this specification can be implemented so as to realize one or more of the following advantages. For example, JTAG interfaces on memory subsystems can allow for connection errors between components of a memory subsystem, such as an improperly installed wire, to be more easily and efficiently diagnosed. Previously, such connection errors were diagnosed by x-raying a memory subsystem, which is a more costly and time consuming procedure. Instead, using the disclosed subject matter, connection errors on a memory subsystem can be readily identified with JTAG interfaces. Furthermore, connection errors that may not be possible to detect through image analysis (e.g., x-ray analysis) of a memory subsystem can be detected using JTAG interfaces.

In another example, JTAG interfaces on memory subsystems can allow for internal operational information, such as information regarding the state of the memory subsystems, to be obtained from without affecting the operation of the memory subsystems. JTAG interfaces can be used as a back channel to monitor and obtain information regarding a memory subsystem during normal operation (e.g., memory subsystem executing operational firmware) and without disturbing the memory subsystem. Such state information may not otherwise be accessible to a host or other device that is external to a memory subsystem. JTAG interfaces on memory subsystems can allow for errors within the memory subsystems to be more accurately identified and diagnosed.

Additionally, JTAG interfaces on memory subsystems allow for an external host or other device to execute various debug operations on memory subsystems using operational firmware for the memory subsystems. Previous memory subsystems may have needed special debug firmware to perform debug operations, which may not be able to simulate all conditions within a memory subsystem while it is operating using its operational firmware. JTAG interfaces can allow for more accurate debug information for memory subsystems to be obtained and used to diagnose errors within the memory subsystems.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

A JTAG interface of a memory subsystem can allow a host or other external device to perform various connectivity tests and/or debug operations on the memory subsystem. A JTAG interface can provide access to internal components of memory subsystems, such as internal connections (e.g., internal bus) between components of memory subsystems (e.g., memory dies, memory controller). A JTAG interface can also provide back channel access to state information for memory subsystems, such as state information for one or more microprocessors that may direct operation of memory subsystems (e.g., access to the contents of volatile memory, registry values, cache contents, current instructions being executed).

Figure 1A:
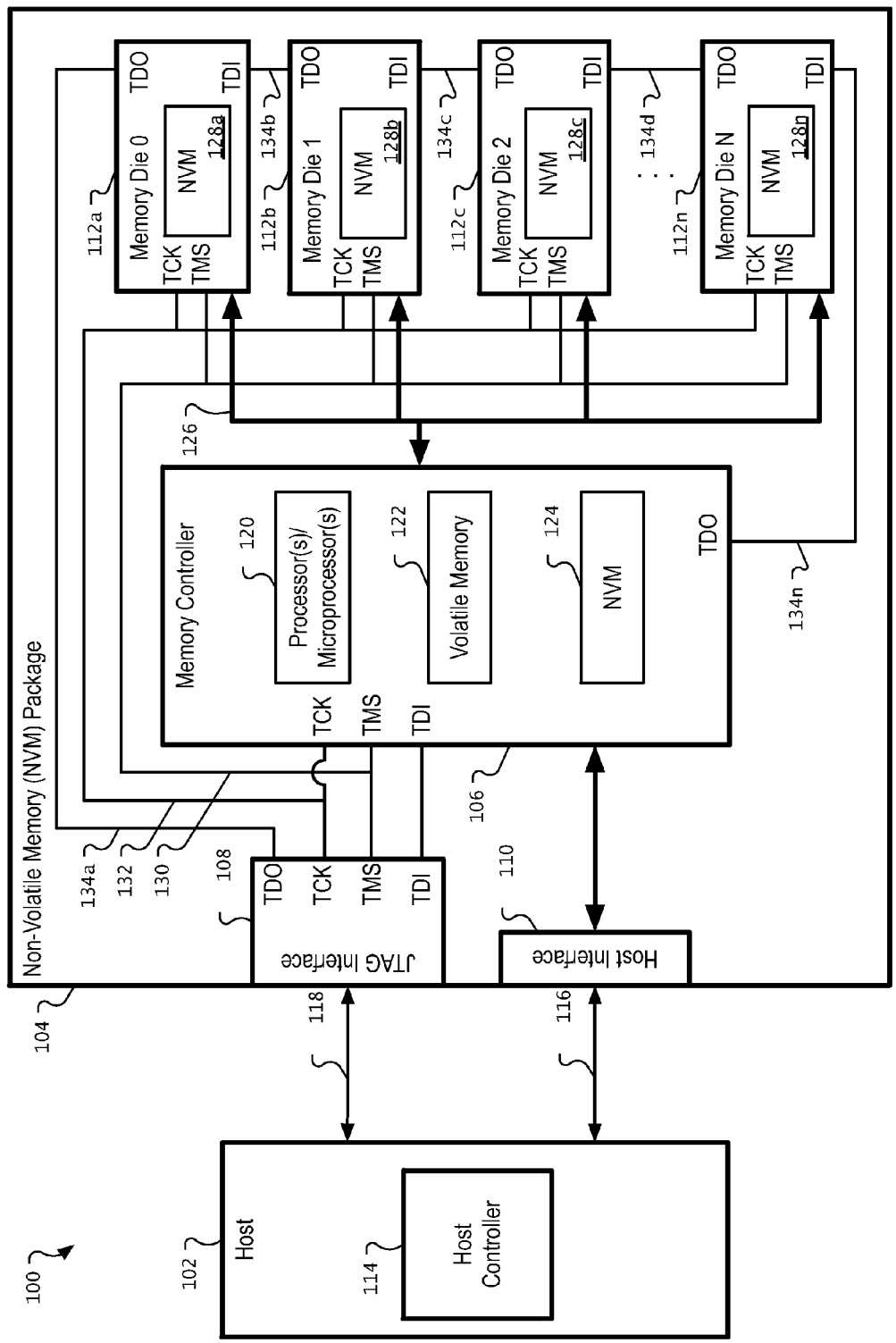
FIGS. 1A-B are diagrams depicting example systems that include hosts and NVM packages with memory controllers and JTAG interfaces.
Figure 1B:
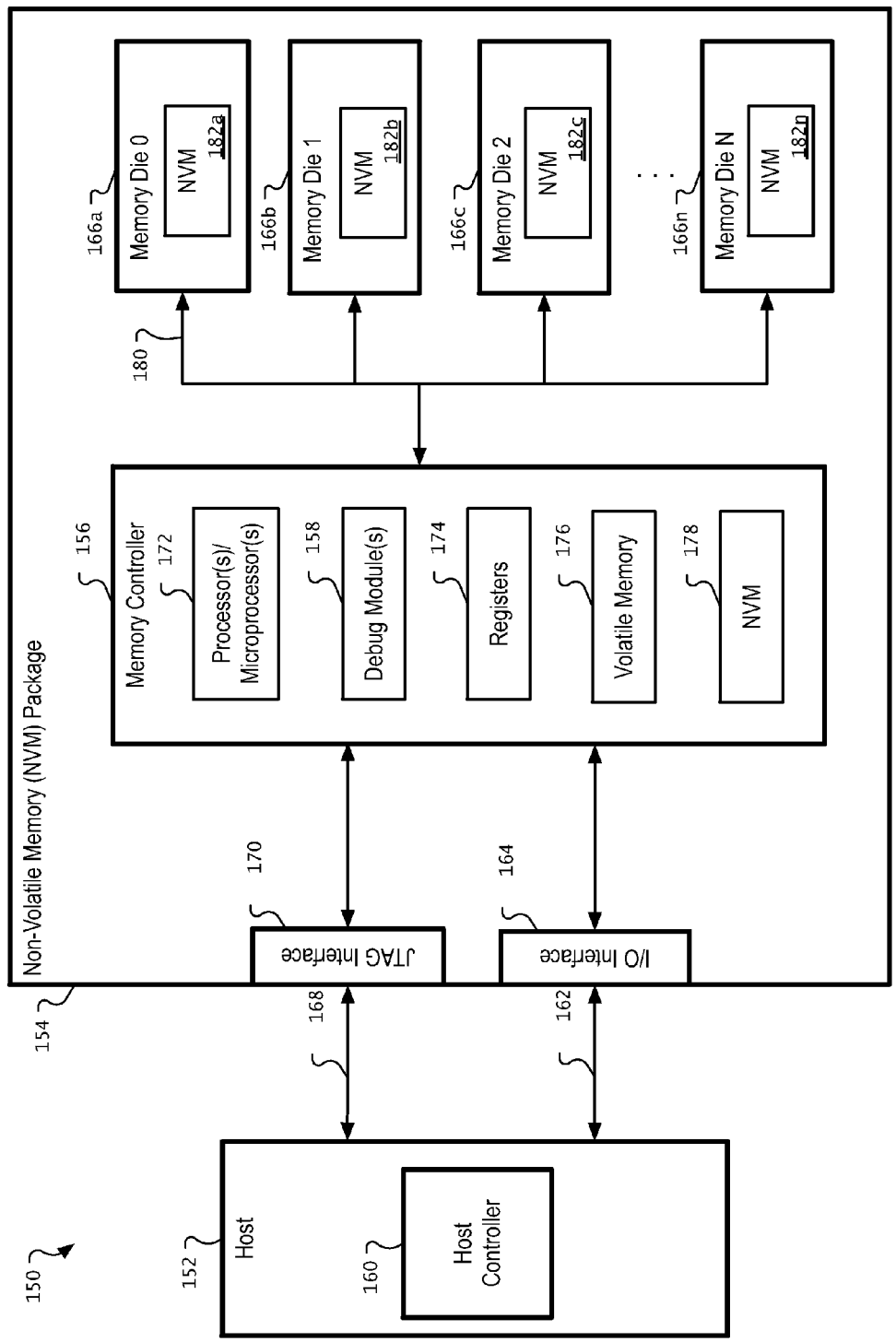

FIGS. 1A-B are diagrams depicting example systems 100 and 150 that include hosts and NVM packages with memory controllers and JTAG interfaces. The depicted NVM packages are example memory subsystems. The example system 100 in FIG. 1A depicts a host 102 and a NVM package 104 that includes a memory controller 106, a JTAG interface 108, a host interface 110, and memory dies 112a-n. The example system 100 depicts a configuration of connections (e.g., wires) between components of the NVM package 104 that can be used for connectivity testing of the NVM package 104 using the JTAG interface 108. The host 102 (and/or other devices that are able to access the JTAG interface 108) can run connectivity tests, such as a boundary scan test, using the JTAG interface 108.

The host 102 can be any of a variety of host devices and/or systems, such as a portable media player, a cellular telephone, a pocket-sized personal computer, a personal digital assistant (PDA), a desktop computer, a laptop computer, and/or a tablet computing device. The NVM package 104 includes NVM (e.g., the memory dies 112a-n) and can be a ball grid array package or other suitable type of integrated circuit (IC) package. The NVM package 104 can be part of and/or separate from the host 102. For example, the host 102 can be a board level device and the NVM package 104 can be a memory subsystem that is installed on the board level device.

The host 102 can include a host controller 114 that is configured to interact with the NVM package 104 to cause the NVM package 104 to perform various operations, such as read, write, and erase operations. The host controller 114 can include one or more processors and/or microprocessors that are configured to perform operations based on the execution of software and/or firmware instructions. Additionally and/or alternatively, the host controller 114 can include hardware-based components, such as application-specific integrated circuits (ASICs), that are configured to perform various operations. The host controller 114 can format information (e.g., commands, data) transmitted to the NVM package 104 according to a communications protocol shared between the host 102 and the NVM package 104.

The host 102 can communicate with the NVM package 104 over a communication channel 116. The communication channel 116 between the host 102 and the NVM package 104 can be fixed (e.g., fixed communications channel) and/or detachable (e.g., a universal serial bus (USB) port). Interactions with the NVM package 104 can include providing commands (e.g., read commands, write commands) and transmitting data, such as data to be written to one or more of the memory dies 112a-n, to the NVM package 104. Communication over the channel 116 can be received at the host interface 110 of the NVM package 104. The host interface 110 can be part of and/or communicatively connected to the memory controller 106.

Additionally and/or alternatively, the host 102 can communicate with the NVM package 104 over a JTAG communication channel 118. The JTAG communication channel 118 can be a fixed and/or detachable communication channel that the host 102 uses to access the JTAG interface 108 of the NVM package 104. For example, the host 102 can provide data and/or instructions over the JTAG communication channel 118 that is received by the JTAG interface 108 that causes the NVM package 104 to perform various operations, such as performing a boundary scan test of the components of the NVM package 104 (e.g., the memory controller 106, the memory dies 112a-n).

In some implementations, the host 102 is a testing device that is configured to test the operation of and/or connections between components of the NVM package 104, such as the memory controller 106 and the memory dies 112a-n. For example, the host 102 can be a device that is used to test the NVM package 104 after it has been assembled and before it is packaged for sale (e.g., packaged as part of an digital media player). Using the JTAG interface 108 of the NVM package 104, the host 102 can determine whether the NVM package 104 and its components are operating and connected to each other properly before the NVM package 104 is packaged and shipped to a consumer. If the NVM package 104 is determined by the host 102 to have a defect, the NVM package 104 can be discarded and/or repaired.

The JTAG interface 108 can include a package-level port (e.g., a JTAG port) that contains a variety of pins to provide the host 102 with access to the components of the NVM package 104. For instance, as depicted in the example system 100, the JTAG interface 108 can include one or more test data input pins (TDI), one or more test data output pins (TDO), one or more test mode select pins (TMS), and one or more test clock pins (TCK). The host 102 can drive various signals over the JTAG communication channel 118 that are received by pins of the JTAG interface 108 and that cause the NVM package 104 to perform various tests, such as a boundary scan. For example, the host 102 can provide a signal that represents test data input and that is received at the TDI pin of the JTAG interface 108. The test data input can include a sequence of data values that are provided as input to one or more of the components of the NVM package 104 to test the operation of the components and/or connections between the components.

For example, test data input provided by the host 102 and received at TDI pin of the JTAG interface 108 can be used as input for the memory controller 106. Such input can be in a variety of forms, such as an instruction for the memory controller 106 to perform and/or data for the memory controller to process. Output that is generated by the memory controller 106, such as output generated in response to the test input provided over the TDI pin, can be obtained and provided to the host 102 over the JTAG communication channel 118 through the TDO pin of the JTAG interface 108. The host 102 can analyze whether the memory controller 106 is operating properly based on whether the output provided over the TDO pin is expected based on the test data input received at the TDI pin from the host 102.

The TDI and TDO pins of the JTAG interface 108 can operate as inputs and outputs for testing and/or debugging of the NVM package 104. Test data can be input at the TDI pin of the JTAG interface 108, testing and/or debugging operations can be performed by components of the NVM package 104 using the input test data, and results from the test/debugging operations can be output to the host 102 at the TDO pin of the JTAG interface 108. The host 102 (and/or another device with access to the output provided to the host 102) can analyze the output and determine whether the components of the NVM package 104 and/or connections between the components are operating as specified for the NVM package 104.

For example, a sequence of test data values can be input at the TDI pin of the JTAG interface 108 and transmitted over a connection between components of the NVM package 104, such as an internal bus between the memory controller 106 and the memory dies 112a-n. The data values that are received on the other side of the bus can be provided as output from the test at TDO pin of the JTAG interface 108. The host 102 (or another device) can compare the test data values input over the TDI pin of the JTAG interface 108 to the data values received as output from the test at the TDO pin of the JTAG interface 108 to determine whether the internal bus in installed and/or functioning properly.

The JTAG interface 108 can receive a clock signal at the TCK pin from the host 102. The clock signal can be used to synchronize the transfer of data to the JTAG interface 108 from the host 102 at the TDI pin and/or from of the JTAG interface 108 to the host 102 at the TDO pins. With each clock pulse a predetermined number of bits of data (e.g., one bit, two bits) can be transferred in and/or out of the JTAG interface 108.

The JTAG interface 108 can receive a mode selection signal from the host 102 at the TMS pin. The mode selection signal can control use of the input data provided at the TDI pin of the JTAG interface 108 by the components (e.g., memory controller 106, memory dies 112a-n) of the NVM package 104. For example, one or more of the components of the NVM package 104 can include a JTAG controller (e.g., a state machine) that is configured to control flow of data to or from the JTAG interface 108.

The JTAG interface 108 can include other pins, configurations, and/or components that are not depicted in the example system 100. For example, the JTAG interface 108 may additionally include a test reset pin that is configured to receive signals from the host 102 that indicate that the state of various registers and/or ports used in the NVM package 106 to perform testing the of the NVM package 106 should be reset to a particular state.

The NVM package 104 can interact with the host 102 over the communication channel 116 using the host interface 108 and the memory controller 106. Like the host controller 114, the memory controller 106 can include one or more processors and/or microprocessors 120 that are configured to perform operations based on the execution of software and/or firmware instructions. Additionally and/or alternatively, the memory controller 106 can include hardware-based components, such as ASICs, that are configured to perform various operations. The memory controller 106 can perform a variety of operations, such as performing memory operations requested by the host 102.

Various memory management functions, such as error correction and wear leveling, can be performed by the host controller 116 and the memory controller 106, alone or in combination. In implementations where the memory controller 106 is configured to perform at least some memory management functions, the NVM package 104 can be termed "managed NVM" (or "managed NAND" for NAND flash memory). This can be in contrast to "raw NVM" (or "raw NAND" for NAND flash memory), in which the host controller 116 external to the NVM package 104 performs memory management functions for the NVM package 104.

The memory controller 106 is depicted as including volatile memory 122, and NVM 124. The volatile memory 122 can be any of a variety of volatile memory types, such as cache memory and RAM. The volatile memory 122 can be used by the memory controller 106 to perform memory operations and/or to temporarily store data that is being read from and/or written to NVM. For example, the volatile memory 122 can store firmware and can use the firmware to perform operations on the NVM package 104 (e.g., read/write operations, debug operations). The NVM 124 can be used by the memory controller 106 to persistently store a variety of information, such as debug logs and instructions/firmware that the NVM package 104 uses to operate.

The memory controller 106 uses a shared internal bus 126 to access NVM used for persistent data storage. In the example system 100, such NVM is depicted as including multiple memory dies 112a-n that include NVMs 128a-n. The memory dies can be a variety of memory dies, such as integrated circuit (IC) dies. Although only the single shared bus 126 is depicted with regard to the NVM package 104, an NVM package can include more than one shared internal bus. Each internal bus can be connected to multiple memory dies (e.g., 2, 3, 4, 8, 32, etc.), as depicted with regard to the multiple memory dies 138a-n. The memory dies 138a-n can be physically arranged in a variety of configurations, such as being stacked. The NVM 128a-n can be any of a variety of NVM, such as NAND flash memory based on floating gate or charge trapping technology, NOR flash memory, erasable programmable read only memory (EPROM), electrically erasable programmable read only memory (EEPROM), ferroelectric RAM (FRAM), magnetoresistive RAM (MRAM), phase change memory (PCM), or any combination thereof. The memory controller 106 can perform various operations (e.g., read/write operations, debug operations, manufacturing test operations) on the NVM 128a-n.

The components of the NVM package 104 can be connected to the JTAG interface 108 in a variety of ways to test various aspects of the NVM package 104, such as connections between the memory controller 106 and the memory dies 112 a-n along the internal bus 126. In the example system 100, the memory controller 106 and the memory dies 112a-n are connected to the JTAG interface 108 (directly and/or indirectly) through connections 130, 132, and/or 134a-n. The connections 130, 132, and/or 134a-n can be any of a variety communication channels (e.g., contact layer connections) to transmit signals between the JTAG interface 108 and the memory controller 106 and/or memory dies 112a-n.

The memory controller 106 and/or the memory dies 112a-n can each have one or more pins to which the connections 130, 132, and/or 134a-n are coupled. As depicted in the example system 100, the memory controller 106 and the memory dies 112a-n include TDI, TDO, TMS, and TCK pins that are coupled to the connections 130, 132, and/or 134a-n. These pins can be coupled to circuitry within the memory controller 106 and/or the memory dies 112a-n that is configured to perform various operations based on the signals received over the TDI, TDO, TMS, and/or TCK pins. For example, circuitry connected to these pins in the memory die 112a can transmit data received at the TDI pin over the internal bus 126 to the memory controller 106a in response to receiving a signal indicating a particular mode at the TMS pin.

The connection 130 is configured to transmit the mode selection signal received at the TMS pin of the JTAG interface 108 to the memory controller 106 and/or the memory dies 112a-n. As described above, the mode selection signal can cause the components of the NVM package 104 to transition between a variety of test modes that indicate how data received over the TDI pin is to be used by the memory controller 106 and/or the memory dies 112a-n. The connection 130 for the TMS pin can be shared among the controller 106 and the memory dies 112a-n so that the components of the NVM package 104 are concurrently using the same testing mode. Other configurations for the connection 130 and/or the TMS pin of the JTAG interface 108 are also possible, such as a plurality of TMS pins and a plurality of the connections 130.

The connection 132 transmits a clock signal received over the JTAG interface 108 at the TCK pin. The clock signal can cause the memory controller 106 and/or the memory dies 112a-n to be synchronized. For instance, each clock pulse received over the connection 132 can cause data to be received over TDI pins and to be transmitted over TDO pins for the memory controller 106 and/or the memory dies 112a-n.

The example connections 134a-n transmit test data input and test data output signals between the JTAG interface 108, the memory controller 106, and the memory dies 112a-n. A variety of configurations for the connections 134a-n are possible. In the example system 100, the connections 134a-n form a chain that starts at the TDI pin of the JTAG interface 108, connects TDO pins to TDI pins of the memory controller 106 and the memory dies 112a-n, and terminates at the TDO pin of the JTAG interface 108. The connections 134a-n can be used to perform a variety of tests on the NVM package 104, such as connectivity testing to determine whether the memory controller 106 and/or the memory dies 112a-n are connected and/or operating properly. Various other configurations of the connections 134a-n are possible.

For example, data received at the TDI pin of the memory controller 106 can be transmitted over the internal bus 126 to the memory die 112a and then provided by the memory die 112a to the TDO pin of the JTAG interface 108, which can provide the data to the host 102 for analysis. The host 102 can determine whether the internal bus 126 was properly installed and/or coupled to the memory controller 106 and memory die 112a based on whether the data received over the JTAG interface 108 matches an expected value. Additionally and/or alternatively, the host 102 can determine whether the memory controller 106 and/or the memory dies 112a-n are possibly defective based on values received over the JTAG interface 108. This is a simplified example. Other more complex testing schemes can be performed on the NVM package 104 using the JTAG interface 108.

The NVM package 104 can be configured with connections 134a-n so that the components of the NVM package 104 are connected in a daisy chain configuration, which may be referred to as a scan chain. Such a scan chain can be used to toggle input and output values that are used and/or transmitted by components of the NVM package 104, such as the memory controller 106 and the NVM dies 112a-n. For example, if the NVM package 104 is a ball grid array package, the scan chain formed by the connections 134a-n can be used to toggle different pads to perform a boundary scan for the NVM package 104.

Referring to FIG. 1B, an example system 150 is depicted that includes a host 152 and a NVM package 154. In the example system 150 is similar to the system 100 described above with regard to FIG. 1A. The NVM package 154 in the system 150 is configured to include one or more debug modules to provide the host 152 with debugging access to at least a memory controller 156 of the NVM package 154. For example, the memory controller 156 can include one or more debug modules 158 to perform functional debugging of the memory controller 158 and/or other components of the NVM package 154. For instance, the debug module 158 can control operation of the memory controller 156 and can cause one or debug operations to be performed, such as halting operation of the memory controller 156 at a defined breakpoint, tracing operations performed by the memory controller 156, and/or executing particular debug code.

The host 152 and the NVM package 154 can be similar to the host 102 and the NVM package 104, respectively, as described above with regard to FIG. 1A. For instance, the host 152 can be any of a variety of host devices and/or systems, such as a portable media player, a cellular telephone, a pocket-sized personal computer, a personal digital assistant (PDA), a desktop computer, a laptop computer, and/or a tablet computing device. The NVM package 154 includes NVM (e.g., the memory dies 166a-n) and can be a ball grid array package or other suitable type of integrated circuit (IC) package. The NVM package 154 can be part of and/or separate from the host 152. For example, the host 152 can be a board level device and the NVM package 154 can be a memory subsystem that is installed on the board level device.

The host 152 can include a host controller 160 that is configured to interact with the NVM package 154 to cause the NVM package 154 to perform various operations, such as read, write, and erase operations. The host controller 160 can include one or more processors and/or microprocessors that are configured to perform operations based on the execution of software and/or firmware instructions. Additionally and/or alternatively, the host controller 160 can include hardware-based components, such as application-specific integrated circuits (ASICs), that are configured to perform various operations.

The host 152 can communicate with the NVM package 154 over a communication channel 162. The communication channel 162 between the host 152 and the NVM package 154 the can be fixed (e.g., fixed communications channel) and/or detachable (e.g., a universal serial bus (USB) port). Interactions with the NVM package 154 can include providing commands (e.g., read commands, write commands) and transmitting data, such as data to be written to one or more of the memory dies 166a-n, to the NVM package 154. Communication over the channel 162 can be received at the host interface 164 of the NVM package 154. The host interface 164 can be part of and/or communicatively connected to the memory controller 156.

Additionally and/or alternatively, the host 152 can communicate with the NVM package 154 over a JTAG communication channel 168. The JTAG communication channel 168 can be a fixed and/or detachable communication channel that the host 152 uses to access the JTAG interface 170 of the NVM package 154. For example, the host 152 can provide data and/or instructions over the JTAG communication channel 168 that is received by the JTAG interface 170 that causes the NVM package 154 to perform various operations, such as performing debug operations to halt and/or trace instructions being performed by the memory controller 156.

In some implementations, the host 152 is a testing device that is configured to test the operation of and/or connections between components of the NVM package 154, such as the memory controller 156 and the memory dies 166a-n. For example, the host 152 can be a device that is used to test the NVM package 154 after it has been assembled and before it is packaged for sale (e.g., packaged as part of a digital media player). Using the JTAG interface 170 of the NVM package 154, the host 152 can determine whether the NVM package 154 and its components are operating and connected to each other properly before the NVM package 154 is packaged and shipped to a consumer. If the NVM package 154 is determined by the host 152 to have a defect, the NVM package 154 can be discarded and/or repaired.

The JTAG interface 170 can be similar to the JTAG interface 108 described above with regard to FIG. 1A. For example, the JTAG interface 108 can be a port that includes one or more pins to receive and/or transmit various signals from the host 152 over the JTAG communication channel 168, such as test data input signals received from the host 152 and/or test data output signals provided to the host 152. The JTAG interface 170 can be communicatively connected to the debug module 158 such that the debug module 158 can receive signals transmitted by the host 152 over the host communication channel 168.

The debug module 158 can be implemented in a variety of ways, such as through one or more circuits (e.g., in-circuit emulators, ASICs), software, and/or firmware. The debug module 158 can perform a variety of debug operations with regard to the memory controller 156, such as controlling operation of the memory controller 156 (e.g., halt operations, trace operations), obtaining state information (e.g., current register values, value of data stored in volatile memory, information indicating one or more instructions being performed by the memory controller 156, data being transmitted and/or received by the memory controller 156 over one or more communication channels), and/or setting various debug instructions and/or data values for the memory controller 156 to process as debug operations.

The debug module 158 can receive instructions from the host 152 through the JTAG interface 170 and the JTAG communication channel 168. For example, the host 152 can provide the debug module 158 with instructions for the debug module 158 to enter one or more debug modes of operation for the memory controller 156 and the NVM package 154. Debug modes of operation can cause the memory controller 156 to perform a variety of debug operations, such as obtaining state information from the memory controller 156. Various debug modes of operation can be performed, such as halt modes of operations where operation of the memory controller 156 is halted at identified breakpoints and/or monitor modes of operation where operation of the memory controller 156 is traced and recorded/reported back to the host 152 through the JTAG interface 170. The debug module 158 can include a variety of circuits, cells, and/or components to control operation of the memory controller 156, such as one or more JTAG cells to set input/output bits for internal logic of the memory controller 156 and/or an in-circuit emulator that is connected to and/or part of one or more processors/microprocessors of the memory controller 156.

The memory controller 156 can additionally include one or more processors and/or microprocessors 172 that are configured to perform operations based on the execution of software and/or firmware instructions. The memory controller 156 can perform a variety of operations, such as performing memory operations requested by the host 152 and/or performing various debug operations as instructed by the debug module 158. Various memory management functions, such as error correction and wear leveling, can be performed by the host controller 160 and the memory controller 156, alone or in combination. In implementations where the memory controller 156 is configured to perform at least some memory management functions, the NVM package 154 can be termed "managed NVM" (or "managed NAND" for NAND flash memory). This can be in contrast to "raw NVM" (or "raw NAND" for NAND flash memory), in which the host controller 160 external to the NVM package 154 performs memory management functions for the NVM package 154.

The memory controller 156 is depicted as including one or more registers 174, volatile memory 176, and NVM 178. The registers 174 can include any of a variety of synchronous circuits that are able to clock data in and out based on one or more clock signals of the processor(s)/microprocessor(s) 172. The registers 174 can be used by the processor(s)/microprocessor(s) 172 to perform memory operations on the NVM package 154. The registers 174 can be used in a variety of capacities, such as storing data, addresses, instructions, conditions, and status information. The volatile memory 176 can be any of a variety of volatile memory types, such as cache memory and RAM. The volatile memory 176 can be used by the memory controller 156 to perform memory operations and/or to temporarily store data that is being read from and/or written to NVM. For example, the volatile memory 176 can store firmware and can use the firmware to perform operations on the NVM package 154 (e.g., read/write operations, debug operations). The NVM 178 can be used by the memory controller 156 and/or the debug module 158 to persistently store a variety of information, such as debug logs, debug code/data, and/or instructions/firmware that the NVM package 154 uses to operate.

The debug module 158 can access state information from the processor(s)/microprocessor(s) 172, the registers 174, the volatile memory 176, and/or the NVM 178. For example, the debug modules 158 can obtain data values that are stored in the registers 174, the volatile memory 176, and/or the NVM 178. The debug modules 158 can use a variety of techniques to obtain such state information. For example, the debug module 158 can include one or more cells (e.g., JTAG cells) that are appropriately positioned to capture data values that written to, stored in, and/or read out from the registers 174, the volatile memory 176, and/or the NVM 178. The debug modules 158 can obtain and/or provide such state information to the host 152 based on instructions received from the host 152 through the JTAG interface 170. The debug modules 158 may also store such state information in one or more debug logs that are stored in the NVM 178.

Like the memory controller 106 described above with regard to FIG. 1A, the memory controller 156 can use a shared internal bus 180 to access NVM used for persistent data storage. In the example system 150, such NVM is depicted as including multiple memory dies 166a-n that include NVMs 182a-n. The memory dies 166a-n can be a variety of memory dies, such as integrated circuit (IC) dies. Although only the single shared bus 180 is depicted with regard to the NVM package 154, an NVM package can include more than one shared internal bus. Each internal bus can be connected to multiple memory dies (e.g., 2, 3, 4, 8, 16, 32, etc.), as depicted with regard to the multiple memory dies 166a-n. The memory dies 166a-n can be physically arranged in a variety of configurations, such as being stacked. The NVM 182a-n can be any of a variety of NVM, such as NAND flash memory based on floating gate or charge trapping technology, NOR flash memory, erasable programmable read only memory (EPROM), electrically erasable programmable read only memory (EEPROM), ferroelectric RAM (FRAM), magnetoresistive RAM (MRAM), phase change memory (PCM), or any combination thereof. The memory controller 106 can perform various operations (e.g., read/write operations, debug operations, manufacturing test operations) on the NVM 182a-n.

Although the systems 100 and 150 are depicted separately, they can be combined into a single system. For example, the system 100 described above with regard to FIG. 1A can include the debug module 158. Similarly, the system 150 can include the pins depicted as being part of the JTAG interface 108 and the connections 130, 132, and 134a-n.

Figure 2:
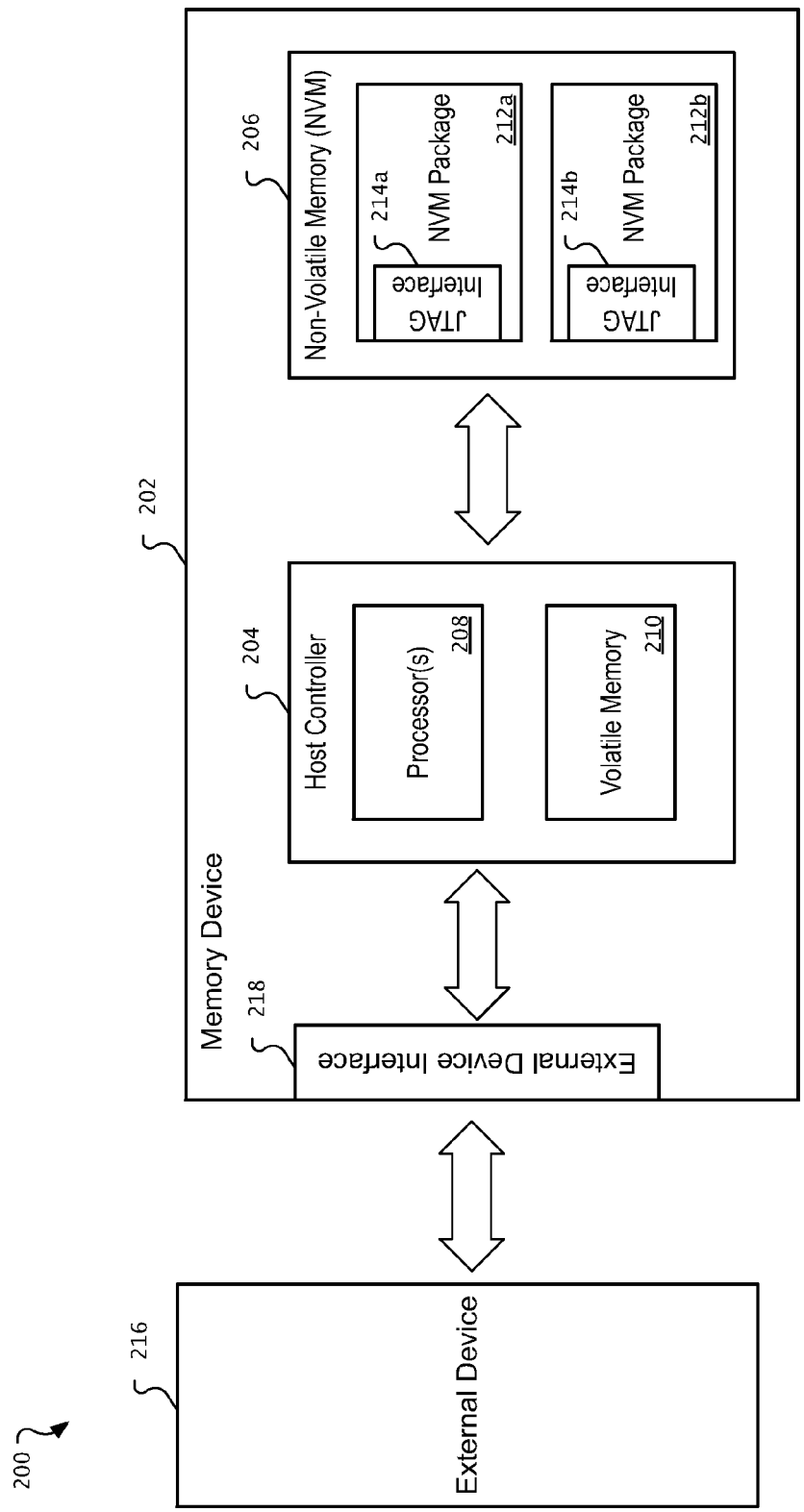
FIG. 2 is a diagram depicting an example system that includes a memory device with a host controller.

FIG. 2 is a diagram depicting an example system 200 that includes a memory device 202 with a host controller 204. The memory device 202 can be any of a variety of memory devices, such as a portable media player, a cellular telephone, a pocket-sized personal computer, a personal digital assistant (PDA), a desktop computer, a laptop computer, a tablet computing device, and/or a removable/portable storage device (e.g., a flash memory card, a USB flash memory drive).

The example memory device 202 is depicted as including a host controller 204 and NVM 206. The host controller 204 can be similar to the host controller 114 described above with regard to FIG. 1A and/or the host controller 160 described above with regard to FIG. 1B. The host controller 204 includes one or more processors 208 and volatile memory 210. The processors 208 can be any variety of processors, such as microprocessors, central processing units (CPUs), graphics processing units (GPUs), or any combination thereof. The volatile memory 210 can be any of a variety of volatile memory, such as RAM and/or cache memory. The volatile memory 210 can be used by the processors 208 to perform various operations, such as retrieving and processing data stored in the NVM 206.

The NVM 206 can include one or more NVM packages 212a-b. The NVM packages 212a-b can each be similar to the NVM package 104 described above with regard to FIG. 1A and/or the NVM package 154 described above with regard to FIG. 1B. For example, the NVM packages 212a-b can each include a plurality of memory dies with NVM (e.g., memory dies 112a-n and NVM 128a-n, memory dies 166a-n and NVM 182a-c), one or more memory controllers (e.g., memory controller 106, memory controller 156), interfaces to communicate with the host controller 204 (e.g., host interface 110, host interface 164), and/or JTAG interfaces 214a-b that are configured to provide the host controller 204 with access to internal components of the NVM packages 212a-b. For example, the host controller 204 can provide instructions and/or test data to the NVM packages 212a-b over the JTAG interfaces 214a-b to cause the NVM packages 212a-b to perform various tests and/or debug operations (e.g., connectivity test, boundary scan, functional debug operation) and to provide various state information (e.g., registry values, volatile memory contents, trace information, breakpoint information) to the host controller 204. The NVM 206 can include any number of NVM packages (e.g., 2, 3, 4, 8, 16, etc.).

As described above with regard to FIGS. 1A-B, management of the NVM 206 can be performed by the host controller 204 and/or controllers of the NVM packages 212a-b. In implementations where controllers of the NVM packages 212a-b control at least a portion of the memory management operations (e.g., error correction, wear leveling, etc.), the NVM packages 212a-b may be considered to be "managed" NVM (e.g., managed NAND).

The system 200 is depicted as also including an external device 216 that can be communicatively connected (directly and/or indirectly) to the memory device 202. Communication between the external device 216 and the memory device 202 can include the transmission of data and/or instructions between the two devices. The external device 216 can be any of a variety of electronic devices, such as a desktop computer, a laptop computer, a server system, and a media computing device (e.g., a media server, a television, a stereo system). The memory device 202 can communicate with the external device 216 through a physical and/or wireless connection using an external device interface 218 (e.g., wireless chip, USB interface, etc.).

For instance, in one example implementation the memory device 202 can be a portable media player and the external device 216 can be a desktop computer that can transmit media files (e.g., audio files, video files, etc.) to each other over a physical connection (e.g., USB cable). In another example implementation, the external device 216 can be testing device (e.g., a device used by manufacturers to test/ensure the quality of manufactured/assembled memory devices) that is configured to test the operation of the memory device 202 using the JTAG interfaces 214a-b before the memory device 200 is packaged and shipped for sale to consumers.

Figure 3:
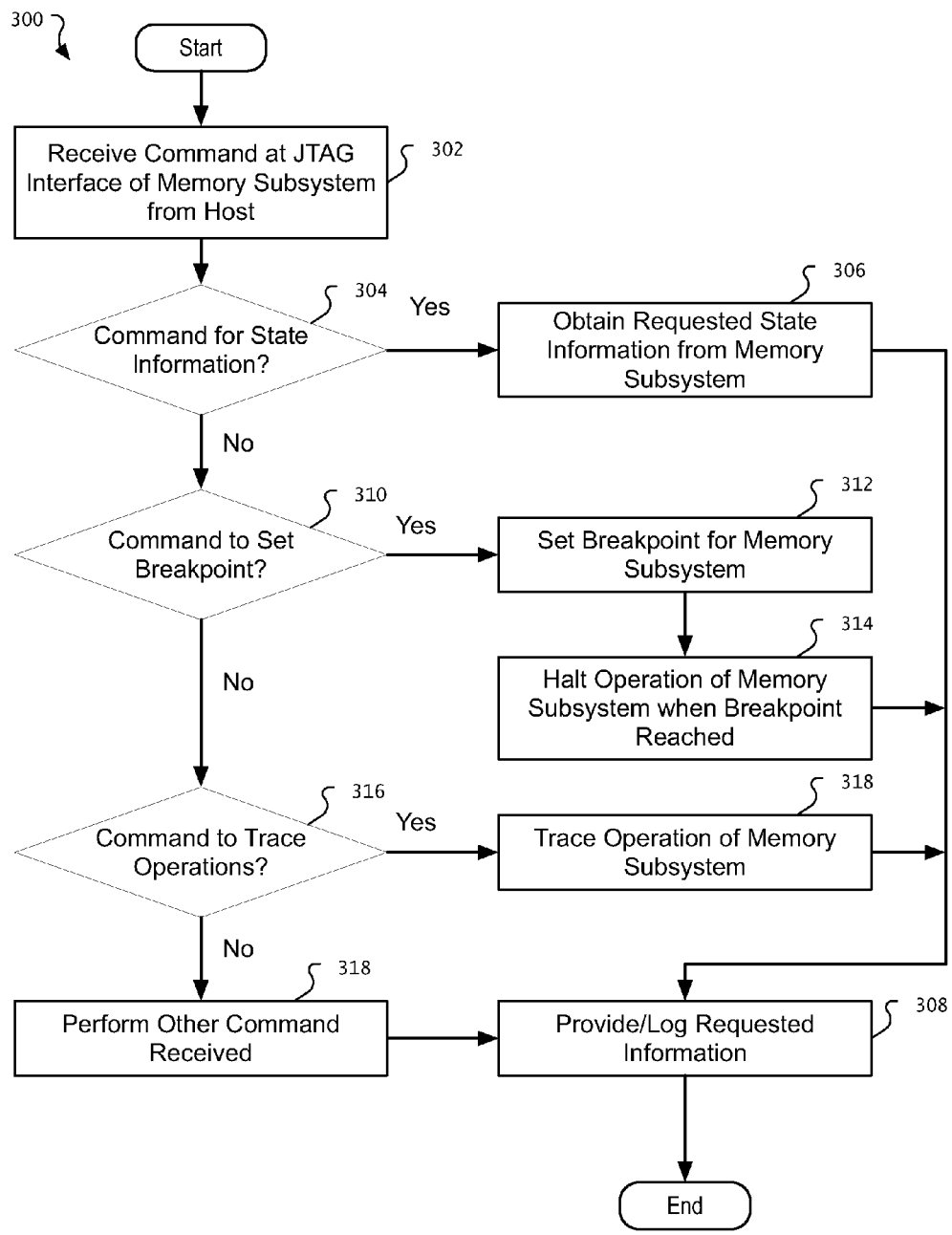
FIG. 3 is a flowchart depicting an example process for providing a host with access to internal components of a memory subsystem.

FIG. 3 is a flowchart depicting an example process 300 for providing a host with access to internal components of a memory subsystem. The process 300 can be performed by a variety of memory subsystems, such as the NVM package 104 described above with regard to FIG. 1A, the NVM package 154 described above with regard to FIG. 1B, and/or the NVM packages 212a-b described above with regard to FIG. 2. In particular, the process 300 can be performed using a JTAG interface of a memory subsystem and one or more debug modules, such as the JTAG interface 170 and the debug module 158 of the NVM package 154.

The process 300 begins by receiving, at a JTAG interface of a memory subsystem, a command (and/or instruction) from a host (at 302). For example, the NVM package 154 can receive a command from the host 152 at the JTAG interface 170. The command (or instructions) can be for a debug module of the memory subsystem to obtain particular information for the memory subsystem, such as state information, and/or to perform various operations, such as debug operations on the memory subsystem.

If the received command is for state information (at 304), then the requested state information can be obtained (at 306). For instance, the command can be for information indicating a current state of volatile memory (e.g., volatile memory 176) and/or registers (e.g., registers 174) of a memory subsystem (e.g., NVM package 154). In response to receiving such a command, a debug module (e.g., debug module 158) can obtain the requested state information. The state information can include a variety of information, such as one or more of current register values, instructions being performed by a memory controller, and/or information being transmitted over one or more internal busses (e.g., internal bus 180) of a memory subsystem (e.g., the NVM package 154).

The obtained state information can be provided to the host using a JTAG interface of the memory subsystem and/or the state information can be stored in a log by the memory subsystem (at 308). For example, the debug module 158 can provide the obtained state information to the host 152 using the JTAG interface 170. In another example, the debug module 158 can store the obtained state information in the NVM 178 for subsequent delivery and/or analysis.

If the received command is to set a breakpoint (at 310), then the breakpoint can be set for a memory subsystem (at 312) and, when the breakpoint is reached, operation of the memory subsystem can be halted (at 314). For example, the host 152 can instruct that a first breakpoint be set for read commands or that a second breakpoint be set for instructions pertaining to the memory die 166a. When one of the set breakpoints is encountered during operation of the NVM package 154, the debug module 158 can cause the operation of the memory controller 156 to be halted. Information associated with the halted operation of the memory subsystem can be provided to the host and/or logged (at 308). For instance, state information can be retrieved in association with operation of a memory subsystem being halted and provided to a host and/or logged.

If the received command is to trace operations (at 316), then the operations of the memory subsystem can be traced (at 318), and provided to a host and/or logged (at 308). For example, in response to receiving a trace command, the NVM package 154 can step through operations and can provide information regarding the instructions that are being performed by the memory controller 156 and/or other state information (e.g., registry and/or volatile memory contents, data being transmitted and/or received over the bus 180).

Other commands can be received from a host and performed (at 318) and information associated with the other commands can be provided and/or logged (at 308). For example, the command received through a JTAG interface (e.g., the JTAG interface 170) can cause a memory subsystem (e.g., the NVM package 154) to enter a debug mode of operation according to which a debug module (e.g., debug module 158) controls operation of a memory controller (e.g., memory controller 156). In such a debug mode of operation, such the debug module 158 may cause various debug operations to be performed, such as running debug test code that may be stored in the NVM 178. The debug mode of operation can include a halt mode that causes operation of the memory controller 156 to be halted while the state information is obtained and/or includes a monitor mode that causes one or more operations performed by the memory controller 156 to be performed and monitored by the debug module 158.

Figure 4:
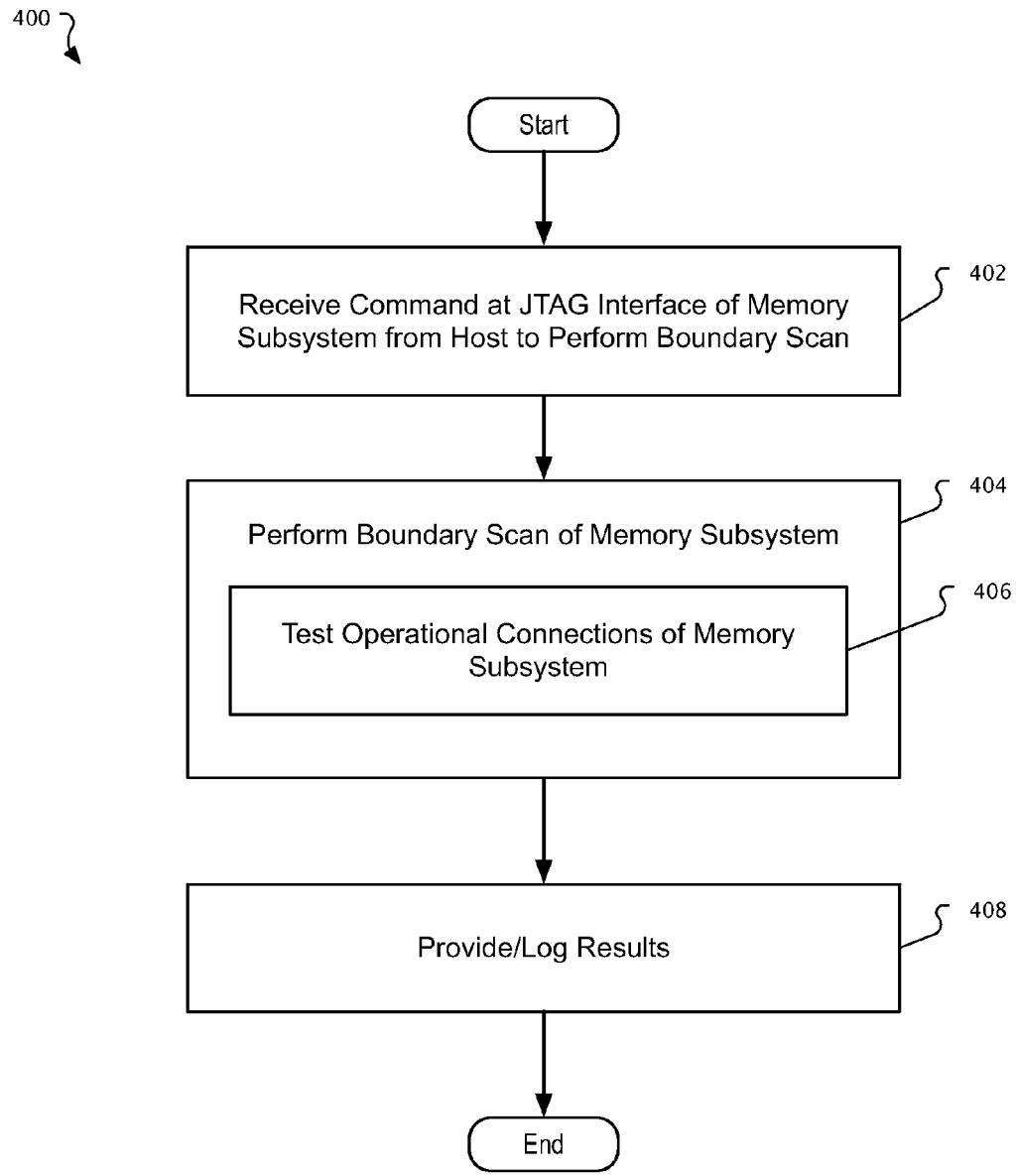
FIG. 4 is a flowchart depicting an example process for providing a host with access to internal components of a memory subsystem.

FIG. 4 is a flowchart depicting an example process 400 for providing a host with access to internal components of a memory subsystem. The process 400 can be performed by a variety of memory subsystems, such as the NVM package 104 described above with regard to FIG. 1A, the NVM package 154 described above with regard to FIG. 1B, and/or the NVM packages 212a-b described above with regard to FIG. 2. In particular, the process 400 can be performed using the JTAG interface 108 and the connections 130-134a-n of the NVM package 104.

The process 400 begins by receiving, at a JTAG interface of a memory subsystem, a command (and/or instruction) from a host (at 402) to perform a boundary scan of the memory subsystem. For example, the host 102 can provide one or more commands to the NVM package 104 over the JTAG interface 108 that indicates a request for the NVM package 104 to perform a boundary scan using the connections 130-134a-n between the memory controller 106 and the memory dies 112a-n. Included with the command, the host 102 can provide input test data to be used when performing the boundary scan. The host 102 can determine the success and/or failure of the boundary scan test based on whether the test data output that is received from the NVM package 104 matches an expected values given the test data input provided over the JTAG interface 108.

In response to receiving the command, the memory subsystem can perform a boundary scan of the memory subsystem (at 404). The boundary scan can cause operational connections (e.g., connections between components used to operate the memory subsystem, such as the internal bus 126) between components of the memory subsystem to be tested (at 406). For instance, the boundary scan can cause a particular sequence of data to be set by the memory controller 130 and transmitted over the internal bus 126 to the memory dies 112a-n. A determination as to the integrity of the internal bus 126 can be made based on whether the expected sequence of data values is received by the memory dies 112a-n.

Results of the boundary scan can be provided to the host and/or logged by the memory subsystem for subsequent retrieval and/or analysis (at 408). For instance, the NVM package 104 can provide results of the boundary scan to the host 102 using the JTAG interface 108 and/or the NVM package 104 can store the results of the boundary scan in the NVM 124 for subsequent retrieval and/or analysis.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. Moreover, other mechanisms for providing access to memory subsystems can be used. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A memory subsystem comprising:
   non-volatile memory;
   a memory controller coupled to the non-volatile memory via a first bus;
   a host interface coupled to a host controller via a second bus, wherein the host interface is configured to receive commands to be executed by the memory controller from the host controller; and
   a joint test action group (JTAG) interface coupled to the host controller via a third bus, wherein the JTAG interface is configured to:
     provide state information associated with the memory controller to the host controller responsive to a request from the host controller;
     receive input test data from the host controller via the third bus;
     send the input test data to the non-volatile memory via the first bus;
     retrieve output data from the non-volatile memory via the first bus; and
     send the output test data to the host controller via the third bus;
   wherein the memory subsystem is configured to be coupled to a board-level memory device that includes the host controller.

2. The memory subsystem of claim 1, further comprising one or more debug modules that control operation of the memory controller based on instructions received from the host controller through the JTAG interface.

3. The memory subsystem of claim 2, wherein the instructions received through the JTAG interface specify a debug mode according to which the debug modules control operation of the memory controller.

4. The memory subsystem of claim 3, wherein the debug mode causes the debug modules to halt operation of the memory controller when the memory controller reaches one or more identified breakpoints in a series of instructions being executed by the memory controller.

5. The memory subsystem of claim 3, wherein the debug mode causes the debug modules to trace operation of the memory subsystem, wherein tracing operation of the memory subsystem includes, at least, outputting information indicating instructions executed by the memory subsystem through the JTAG interface.

6. The memory subsystem of claim 1, wherein the state information includes one or more current register values.

7. The memory subsystem of claim 1, wherein the state information includes information indicating one or more instructions being performed by the memory controller.

8. The memory subsystem of claim 1, wherein the state information includes data being transmitted over the first bus or the second bus.

9. The memory subsystem of claim 1, wherein the memory subsystem is a flash memory package and the non-volatile memory includes flash memory.

10. The memory subsystem of claim 9, wherein the flash memory includes one or more NAND flash memory dies.

11. The memory subsystem of claim 1, wherein the memory subsystem is limited to performing memory operations as directed by the host controller, and wherein the host controller performs input and output operations for the board-level memory device.

12. A system comprising:
a host controller of a board-level memory device; and
one or more memory subsystems of the board-level memory device that are accessible by the host controller over a plurality of buses, each of the memory subsystems including:
non-volatile memory;
a memory controller coupled to the non-volatile memory via a first bus of the plurality of buses;
a host interface coupled to a host controller over a second bus, wherein the host interface is configured to receive commands to be executed by the memory controller from the host controller; and
a Joint Test Action Group (JTAG) interface coupled to the host controller via a third bus of the plurality of buses, wherein the JTAG interface is configured to:
provide state information associated with the memory subsystem to the host controller responsive to a request form the host controller;
receive input test data from the host controller via the third bus;
send the input test data to the non-volatile memory via the first bus;
retrieve output test data from the non-volatile memory via the first bus; and
send the output test data to the host controller via the third bus.

13. The system claim 12, wherein each of the memory subsystems the further includes one or more debug modules that control operation of the memory controller based on instructions received from the host controller through the JTAG interface.

14. The system of claim 13, wherein the instructions received through the JTAG interface specify a debug mode according to which the debug modules control operation of the memory controller.

15. The system of claim 14, wherein the debug mode includes a halt mode that causes operation of the memory controller to be halted while the state information is obtained.

16. The system of claim 14, wherein the debug mode includes a monitor mode that causes one or more operations performed by memory controller to be performed and monitored by the debug modules.

17. The system of claim 12, wherein the state information includes one or more current register values.

18. The system of claim 12, wherein the state information includes one or more instructions being performed by the memory controller.

19. The system of claim 12, wherein the state information includes information being transmitted over one or more internal busses of the memory subsystem.

20. The system of claim 12, wherein the memory subsystem is a flash memory package and the non-volatile memory includes flash memory.

21. The system of claim 20, wherein the flash memory includes one or more NAND flash memory dies.

22. The system of claim 12, wherein the memory subsystem is limited to performing memory operations as directed by the host controller, and wherein the host controller performs input and output operations for the board-level memory device.

23. A method comprising:
receiving, at a host interface of a memory controller of a memory subsystem, commands to be executed by the memory controller from a host controller, wherein the host interface is coupled to the host controller via a second bus, and wherein the memory controller is coupled to non-volatile memory via a first bus;
receiving, at the memory controller through a Joint Test Action Group (JTAG) interface of the memory subsystem, a command from the host controller to obtain status information for the memory subsystem and input test data, wherein the JTAG interface is coupled to the host controller via a third bus;
sending the input test data to non-volatile memory via the first bus;
retrieving output test data from the non-volatile memory via the first bus;
sending the output test data to host controller;
accessing the state information during operation of the memory subsystem; and
providing the status information to the host controller, wherein the memory subsystem is coupled to a board-level memory device that includes the host controller.

24. The method of claim 23, wherein the state information is accessed using a debug module that controls operation of the memory controller based on the command received from the host controller through the JTAG interface.

25. The method of claim 24, wherein the command received through the JTAG interface specifies a debug mode according to which the debug modules control operation of the memory controller.

26. The method of claim 25, wherein the debug mode includes a halt mode that causes operation of the memory controller to be halted while the state information is obtained.

27. The method of claim 25, wherein the debug mode includes a monitor mode that causes one or more operations performed by memory controller to be performed and monitored by the debug modules.

28. The method of claim 25, wherein the state information includes one or more of current register values, instructions being performed by the memory controller, and information being transmitted over one or more internal busses of the memory subsystem.

29. The method of claim 23, wherein the memory subsystem is a flash memory package and the non-volatile memory includes flash memory.

30. The method of claim 29, wherein the flash memory includes one or more NAND flash memory dies.

31. The method of claim 23, wherein the memory subsystem is limited to performing memory operations as directed by the host controller, and wherein the host controller performs input and output operations for the board-level memory device.

* * * * *

UNITED STATES PATENT AND TRADEMARK OFFICE
CERTIFICATE OF CORRECTION

PATENT NO. : 8,880,779 B2  
APPLICATION NO. : 13/204037  
DATED : November 4, 2014  
INVENTOR(S) : Anthony Fai et al.

Page 1 of 1

It is certified that error appears in the above-identified patent and that said Letters Patent is hereby corrected as shown below:

In the Claims:

Claim 12, Column 17, Line 50, please delete "form" and substitute -- from --

Signed and Sealed this  
Tenth Day of February, 2015

Michelle K. Lee  
*Deputy Director of the United States Patent and Trademark Office*